(12) United States Patent
Chen (10) Patent No.: US 10,913,077 B1
(45) Date of Patent: Feb. 9, 2021

(54) DISPENSING DEVICE (71) Applicant: VESCIR LTD., Taipei (TW)

(72) Inventor: Wei-Yu Chen, Taipei (TW)

(73) Assignee: VESCIR LTD., Taipei (TW)

( * ) Notice: Subject to any disclaimer, the term of this patent is extended or adjusted under 35 U.S.C. 154(b) by 0 days.

(21) Appl. No.: 16/675,433

(22) Filed: Nov. 6, 2019

(30) Foreign Application Priority Data

Aug. 1, 2019 (TW) .............................. 108127382 A (51) Int. Cl.
*B05B 1/12* (2006.01)
*G01F 11/08* (2006.01)
*B65D 81/32* (2006.01)
*B05B 11/00* (2006.01)

(52) U.S. Cl.
CPC ............ *B05B 1/12* (2013.01); *B05B 11/0038* (2018.08); *B65D 81/3205* (2013.01); *G01F 11/08* (2013.01)

(58) Field of Classification Search
CPC .... B05B 1/12; B05B 11/0038; B65D 81/3205
USPC ....................................................... 222/134
See application file for complete search history.

(56) References Cited

U.S. PATENT DOCUMENTS

| | | | | | |
|---|---|---|---|---|---|
| 5,169,029 | A | * | 12/1992 | Behar | ................. B05B 11/3084 128/200.23 |
| 5,411,176 | A | * | 5/1995 | Favre | ................. B05B 11/0005 222/94 |
| 6,945,430 | B2 | * | 9/2005 | Bloc | ................. B05B 11/3084 222/135 |
| 7,222,752 | B2 | * | 5/2007 | Ponton | ................ B05B 11/3083 222/134 |
| 9,162,241 | B2 | * | 10/2015 | Holzmann | .......... B05B 11/3084 |
| 9,410,837 | B2 | * | 8/2016 | Brugger | .............. B05B 11/3083 |
| 2010/0044394 | A1 | * | 2/2010 | Milian | ................ B05B 11/3008 222/135 |
| 2013/0299514 | A1 | * | 11/2013 | Holzmann | ............ G01F 11/023 222/134 |

* cited by examiner

*Primary Examiner* — Vishal Pancholi
(74) *Attorney, Agent, or Firm* — Schmeiser. Olsen & Watts, LLP (57) ABSTRACT

A dispensing device includes a nozzle, two containers and a regulation device. The containers each include a bottle and a pump unit. The bottle has a regulated unit. The regulated unit is disposed at the bottom of the bottle. The pump unit linearly, movably connects to the bottle. The pump unit is in communication with the nozzle. The pump unit provides a substance in the bottle to the nozzle. The regulation device rotatably connects to the regulated units of the two bottles or is positioned proximate to the regulated units of the two bottles. The regulation device is rotated such that the bottles vary in height relative to the regulation device. Therefore, the dispensing device provides two types of substances simultaneously and regulates a proportion of the provided substances.

9 Claims, 10 Drawing Sheets

DISPENSING DEVICE

CROSS-REFERENCE TO RELATED APPLICATION

This non-provisional application claims priority under 35 U.S.C. § 119(a) on Patent Application No(s). 108127382 filed in Taiwan, R.O.C. on Aug. 1, 2019, the entire contents of which are hereby incorporated by reference.

BACKGROUND OF THE INVENTION

1. Field of the Invention

The present disclosure relates to dispensing devices, and in particular to a dispensing device for providing a constant quantity of a substance.

2. Description of the Related Art

A conventional dispenser, which is a container for providing a constant quantity of a substance, includes a bottle and a nozzle. The nozzle has a pump. When compressed, a substance contained in the bottle is ejected out of the nozzle by a constant quantity with the pump. The conventional dispenser provides a constant quantity of a substance, such as shampoo, body wash, and alcohol, each time.

BRIEF SUMMARY OF THE INVENTION

A conventional dual-tube dispenser provides two types of substances simultaneously. To obtain two types of substances simultaneously, a user presses the conventional dual-tube dispenser. However, the conventional dispenser cannot regulate the amount of substances thus dispensed according to a specific proportion.

An objective of the present disclosure is to provide a dispensing device comprising a nozzle, two containers and a regulation device. The nozzle has an ejection hole. The containers each comprise a bottle and a pump unit. The bottle provides a substance. The bottle has a regulated unit. The regulated unit is disposed at the bottom of the bottle. The pump unit linearly, movably connects to the bottle. The pump unit is in communication with the nozzle. The pump unit provides the substance in the bottle to the nozzle. The regulation device rotatably connects to the regulated units of the two bottles or is positioned proximate to the regulated units of the two bottles. When the regulation device is rotated, the bottles vary in height relative to the regulation device, allowing the bottles to provide the substance in the bottles according to a specific proportion.

Regarding the dispensing device, the regulated unit of each said bottle is a step surface or an oblique surface, and the regulation device comprises two abutting portions abutting against the regulated units of the two bottles respectively or positioned proximate to the regulated units of the two bottles respectively, such that the two abutting portions move along the regulated units of the two bottles when the two abutting portions rotate together with the regulation device.

Regarding the dispensing device, each said regulated unit has a stop element disposed at a highest point or a lowest point of a step surface or an oblique surface of a corresponding one of the bottles.

The dispensing device further comprises a reset device positioned proximate to the two bottles or disposed on the two bottles. The reset device exerts a thrust for pushing the two bottles.

Regarding the dispensing device, the reset device comprises a resilient component and a pushing element. The pushing element is positioned proximate to the bottoms of the two bottles or is disposed at the bottoms of the two bottles. The resilient component abuts against the pushing element.

The dispensing device further comprises a bottle limiting device disposed between the two bottles and adapted to prevent the two bottles from moving laterally or rotating.

Regarding the dispensing device, the bottle limiting device comprises at least a plate or at least a block.

Regarding the dispensing device, a positioning device is disposed between the nozzle and the regulation device and disposed in the vicinity of the two bottles or on the peripheral surfaces of the two bottles, whereas a regulation limiting unit is disposed between the positioning device and the regulation device and comprising a plurality of regulation limiting concave portions disposed on the inner peripheral surfaces of the regulation device and a regulation limiting convex portion disposed on the positioning device peripheral surfaces and corresponding in position to one of the regulation limiting concave portions.

The dispensing device further comprises a positioning device disposed in the vicinity of the two bottles or on peripheral surfaces of the two bottles. The positioning device ensures that the two bottles face in a specific direction while connecting to the nozzle.

The dispensing device further comprises a positioning device comprising a casing and a plurality of restrictive elements. The restrictive elements are disposed at the inner wall of the casing. The restrictive elements and the inner wall of the casing jointly define two receiving spaces. The two receiving spaces are each of asymmetric shape and are adapted to receive the two bottles.

Regarding the dispensing device, the nozzle has two guide chambers. The two guide chambers are in communication with an ejection hole of the nozzle. The two pump units fit inside the two guide chambers of the nozzle, respectively.

The dispensing device overcomes a drawback of the prior art: a conventional dispenser provides two types of substances simultaneously but fails to regulate the amounts of the provided substances according to a specific proportion.

DETAILED DESCRIPTION OF THE INVENTION

To facilitate understanding of the object, characteristics and effects of this present disclosure, embodiments together with the attached drawings for the detailed description of the present disclosure are provided.

Figure 1:
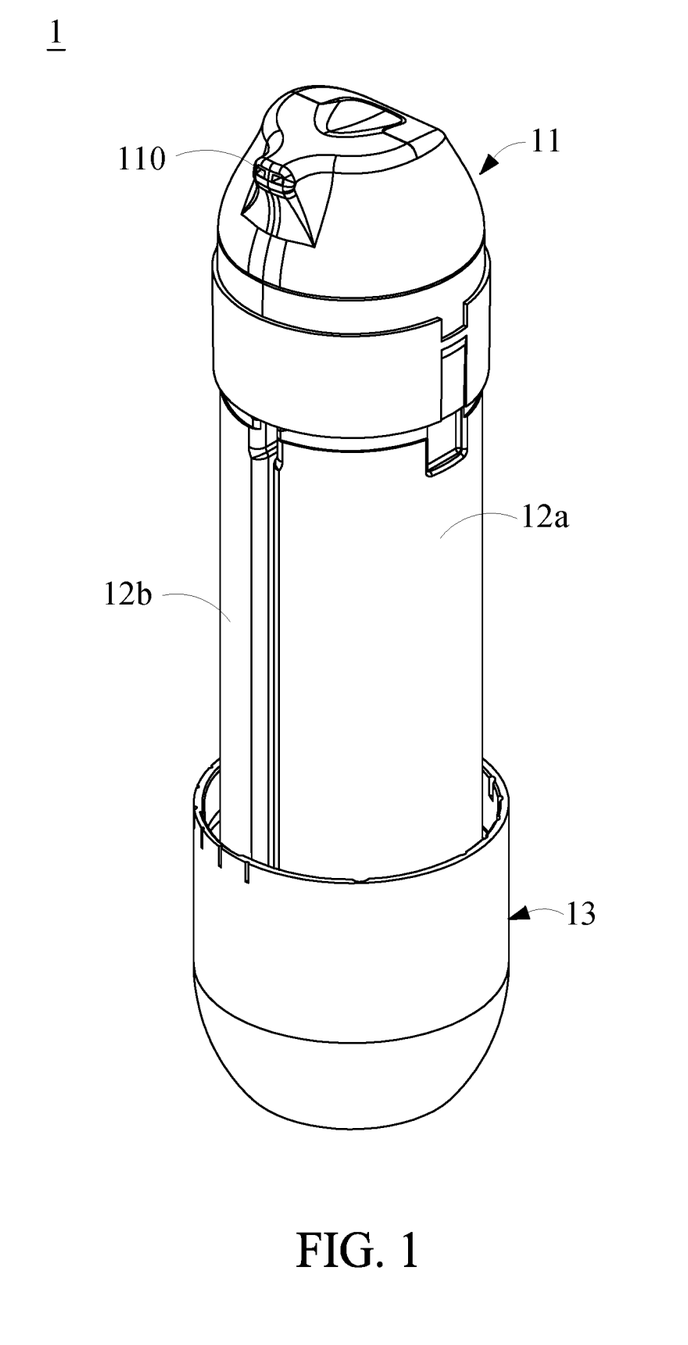
FIG. 1 is a perspective view of a dispensing device according to embodiment 1 of the present disclosure.
Figure 2:
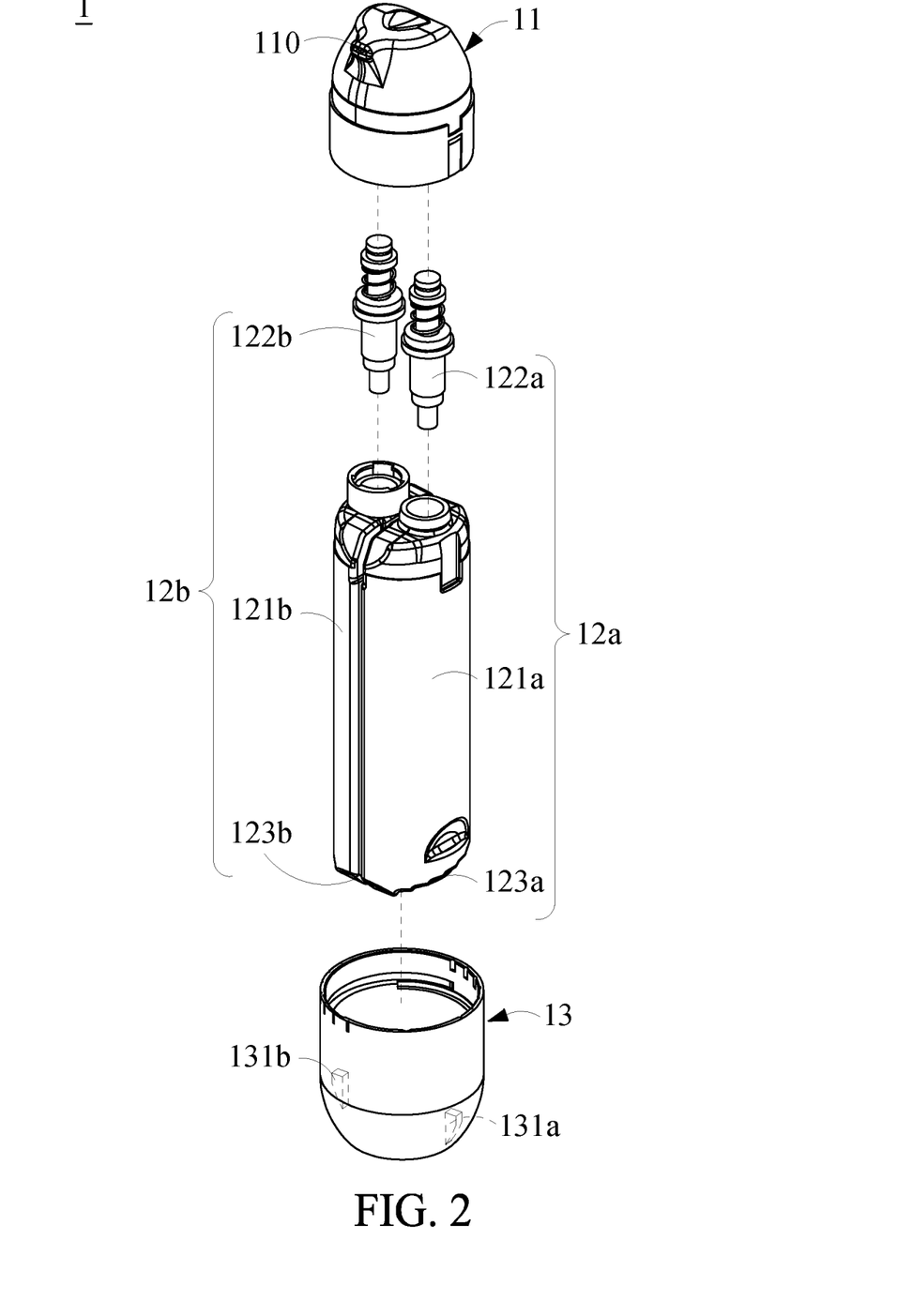
FIG. 2 is an exploded view of the dispensing device according to embodiment 1 of the present disclosure.
Figure 3:
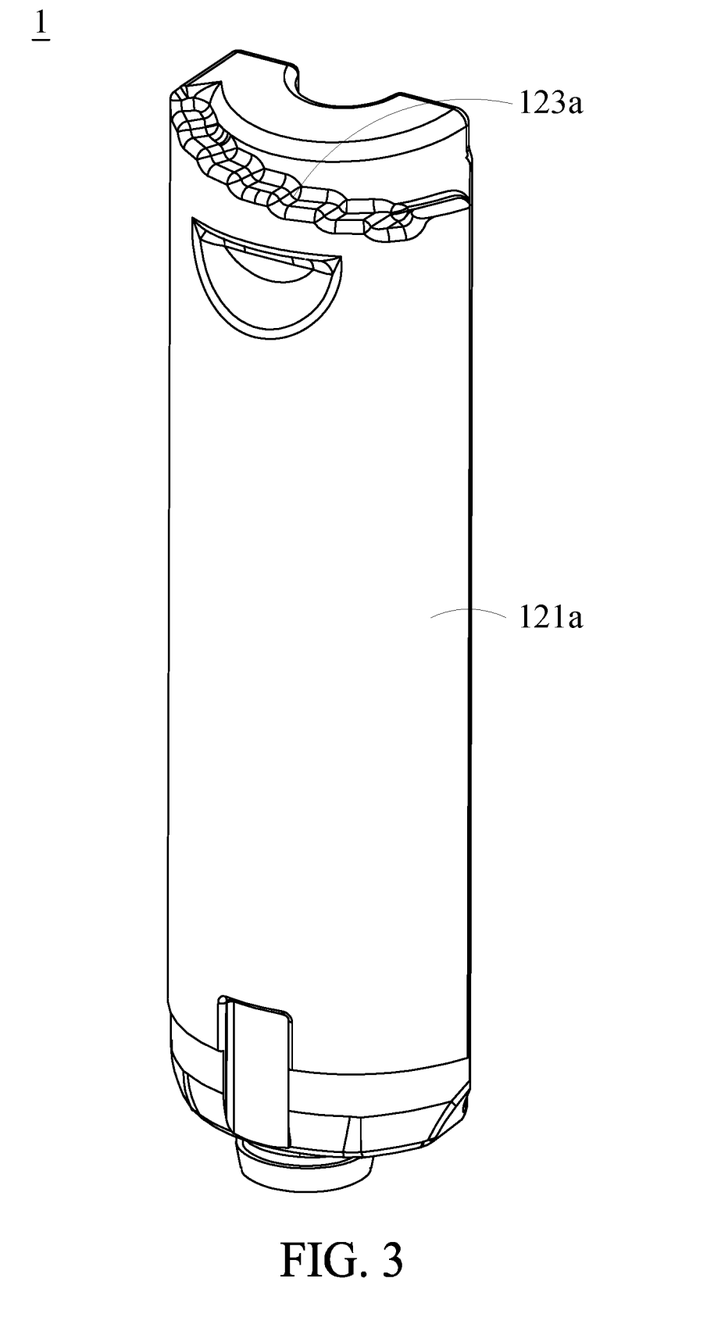
FIG. 3 is a schematic view of the dispensing device according to embodiment 1 of the present disclosure, showing some of its components upside down.
Figure 4:
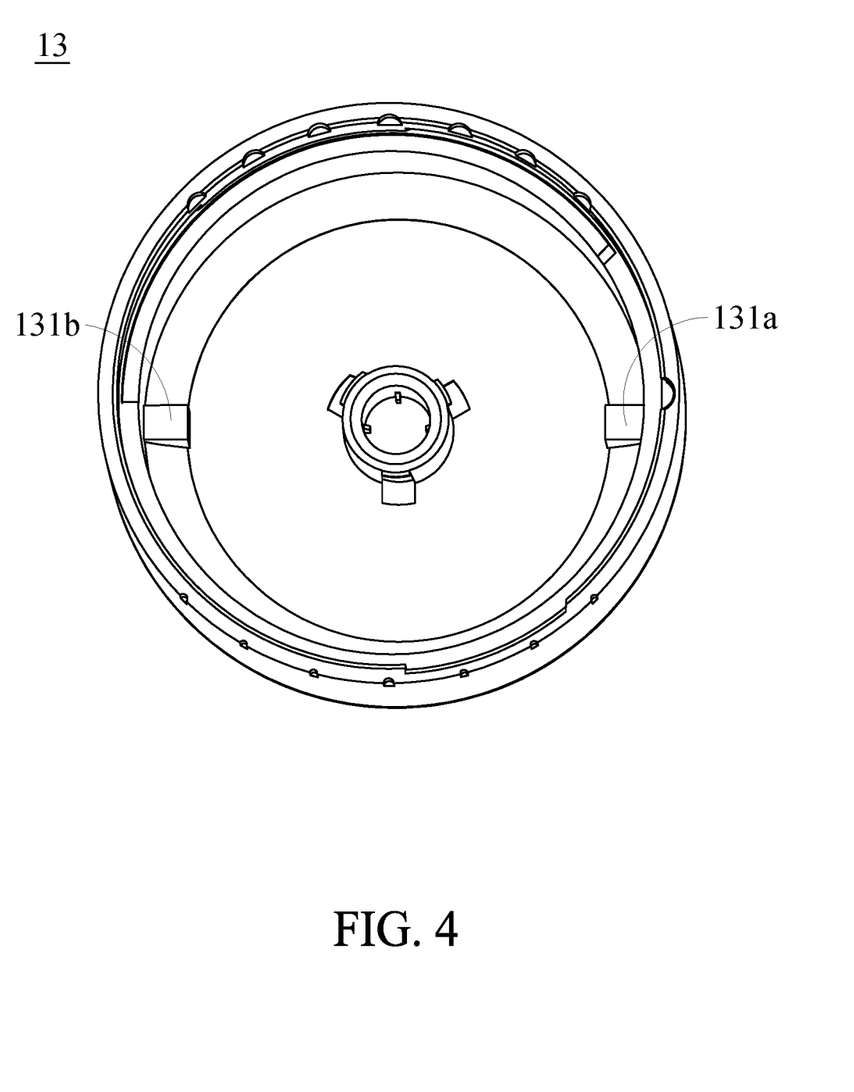
FIG. 4 is a schematic view of some components of the dispensing device according to embodiment 1 of the present disclosure.
Figure 5:
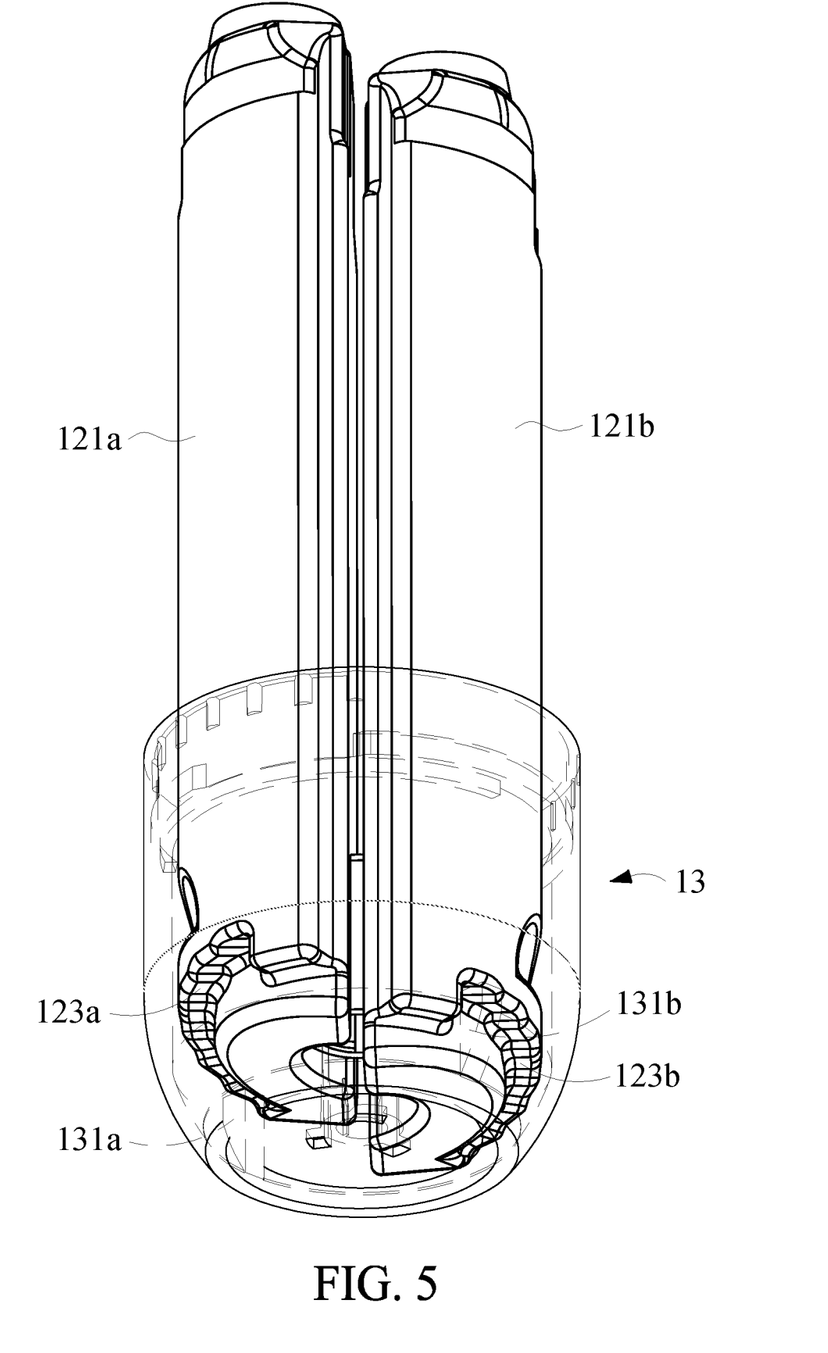
FIG. 5 is a cross-sectional view of some components of the dispensing device according to embodiment 1 of the present disclosure.

The embodiment 1 of the present disclosure provides a dispensing device 1. Referring to FIGS. 1-5, the dispensing device 1 comprises a nozzle 11, two containers 12a, 12b and a regulation device 13. The nozzle 11 has an ejection hole 110. The container 12a comprises a bottle 121a and a pump unit 122a. The bottle 121a provides a substance. The bottle 121a has a regulated unit 123a. The regulated unit 123a is disposed at the bottom of the bottle 121a. The pump unit 122a linearly, movably connects to the bottle 121a. The pump unit 122a is in communication with the nozzle 11. The pump unit 122a provides the substance in the bottle to the nozzle 11, and then the substance is discharged via the ejection hole 110. The container 12b is identical to the container 12a structurally and functionally. As shown in FIG. 5, the regulation device 13 rotatably connects to the regulated units 123a, 123b of the two bottles 121a, 121b. When the regulation device 13 is rotated, the bottles 121a, 121b vary in height relative to the regulation device 13 such that the distance from the pump units 122a, 122b in the containers 12a, 12b to the nozzle 11 varies. When the nozzle 11 is pressed, the pump units 122a, 122b differ in terms of the height related to the press and thus provide different amounts of the substance to the nozzle 11. Therefore, if the bottle 121a is the higher one relative to the regulation device 13, the pump unit 122a will be the closer one relative to the nozzle 11. If the bottle 121b is the lower one relative to the regulation device 13, the pump unit 122b will be the farther one relative to the nozzle 11.

Since the pump unit 122a is the closer one relative to the nozzle 11, the pump unit 122a undergoes a longer downward displacement when driven by the nozzle 11 being pressed by a user, and in consequence the pump unit 122a provides a greater amount of the substance to the nozzle 11. Since the pump unit 122b is the father one relative to the nozzle 11, the pump unit 122b undergoes a shorter downward displacement when driven by the nozzle 11 being pressed by a user, and in consequence the pump unit 122b provides a lesser amount of the substance to the nozzle 11. Therefore, the dispensing device 1 provides two types of substances simultaneously, and the quantity of the two types of substances thus provided is subject to variation. Given the provision quantity regulation mechanism of the regulation device 13, the user can rotate the regulation device 13 and thus vary the amounts of the two types of provided substances as needed. Given the regulation device 13, the dispensing device 1 solves a drawback of the prior art, that is, although a conventional dispenser provides two types of substances simultaneously, it cannot regulate the amount of the provided substances according to a specific proportion.

Referring to FIGS. 2-5, the regulation device 13 comprises two abutting portions 131a, 131b for abutting against the regulated units 123a, 123b (each of which is in the form of a step surface) of the two bottles 121a, 121b, respectively. The abutting portion 131a corresponds in position to the lowest point of the regulated unit 123a. The abutting portion 131b corresponds in position to the highest point of the regulated unit 123b. Therefore, the abutting portion 131a abuts against the lowest point of the regulated unit 123a to thereby abut against the lowest point of the bottom of the bottle 121a; hence, owing to the abutting portion 131a in operation, the bottle 121a is close to the nozzle 11. The abutting portion 131b abuts against the highest point of the regulated unit 123b to thereby abut against a relatively higher point of the bottom of the bottle 121b. Therefore, the bottle 121b is farther from the nozzle 11 than the bottle 121a. When the two abutting portions 131a, 131b rotate together with the regulation device 13, the abutting portion 131a moves from the lowest point of the regulated unit 123a to the highest point of the regulated unit 123a, whereas the abutting portion 131b moves from the highest point of the regulated unit 123a to the lowest point of the regulated unit 123a. Therefore, by rotating the regulation device 13, the user can alter the height of the two bottles 121a, 121b relative to the regulation device 13 to thereby alter the provision amounts of the two types of substances in the two bottles 121a, 121b and proportions of the two types of substances provided. The dispensing device 1 of the present disclosure regulates the feeds of the two containers 12a, 12b according to a specific proportion. Given the step surfaces, it is feasible to attain specific proportions of 0/100, 10/90, 20/80, 30/70, 40/60, 50/50, 60/40, 70/30, 80/20, 90/10, and 100/0, or specific proportions of 0/100, 20/80, 40/60, 60/40, 80/20, and 100/0. A desirable one of the specific proportions is chosen by regulating the height of the step on the step surface as needed.

In a variant embodiment, the regulation device 13 does not connect to the two bottles 121a, 121b but is positioned proximate to the two bottles 121a, 121b, and it is only when the height of the two bottles 121a, 121b has to be regulated that the regulation device 13 connects to the two bottles 121a, 121b; hence, the regulation device 13 of the present disclosure is not limited to embodiment 1. In embodiment 1, the two regulated units 123a, 123b are each a step surface. In a variant embodiment, the two regulated units 123a, 123b are each an oblique surface of any other shape or structure, such as a slope. Hence, the two regulated units 123a, 123b of the present disclosure are not restricted to embodiment 1.

Figure 6:
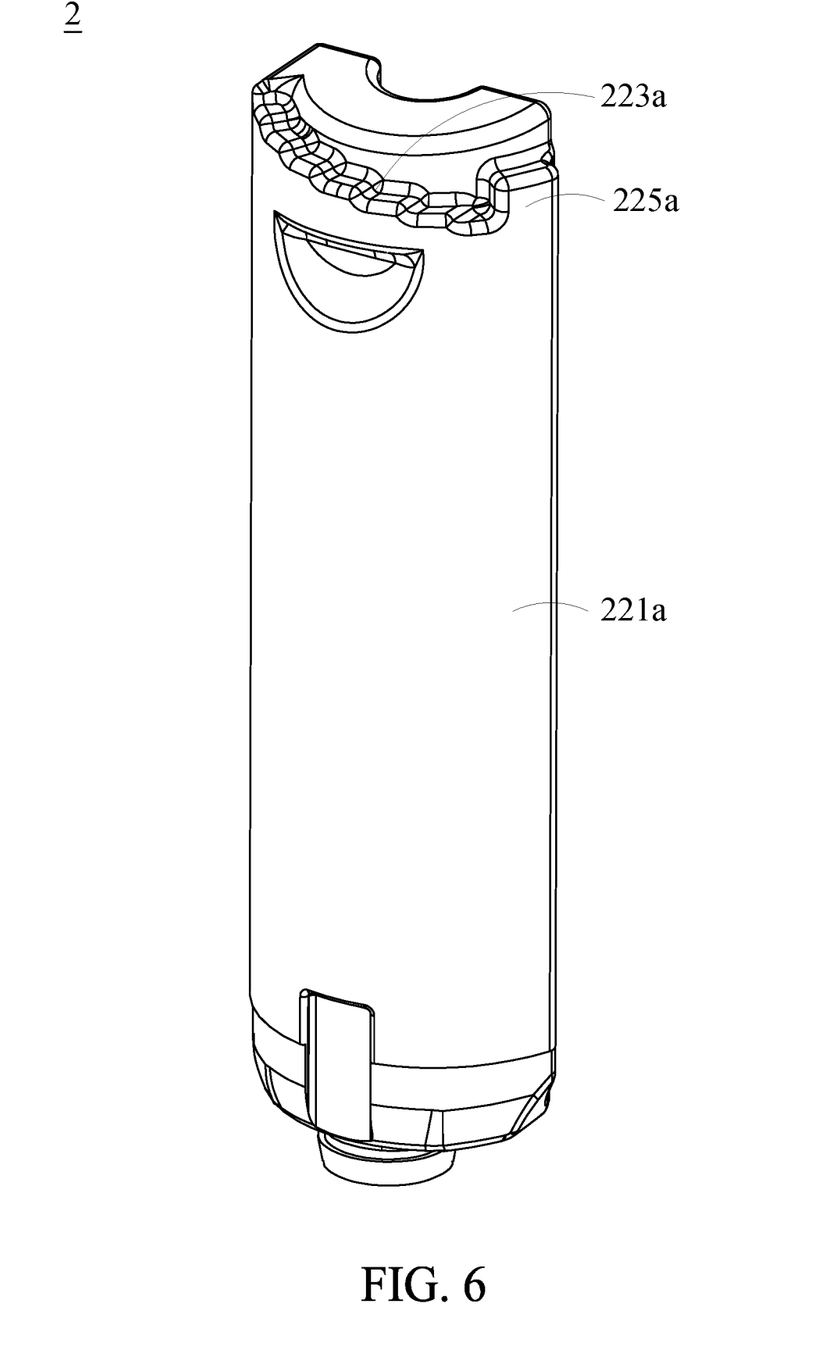
FIG. 6 is a schematic view of the dispensing device according to embodiment 2 of the present disclosure, showing some of its components upside down.

Embodiment 2 of the present disclosure provides a dispensing device 2. Referring to FIG. 6, the regulated unit 223a comprises a stop element 225a. The stop element 225a is disposed at the highest point of the regulated unit 223a of the bottle 221a. When a corresponding one of the abutting portions (not shown, but can be compared to the abutting portion 131a in FIG. 4) moves from the lowest point of the regulated unit 223a to the highest point of the regulated unit 223a, the abutting portion is exactly blocked by the stop element 225a such that the regulation device can no longer rotate. In a variant embodiment, by altering the tilting direction of the two regulation limiting units of the dispensing device 2, the stop element 225a is disposed at the lowest point of the regulated unit 223a, so as to achieve positional limitation, but embodiment 2 is not restrictive of the aforesaid technical feature.

Figure 7:
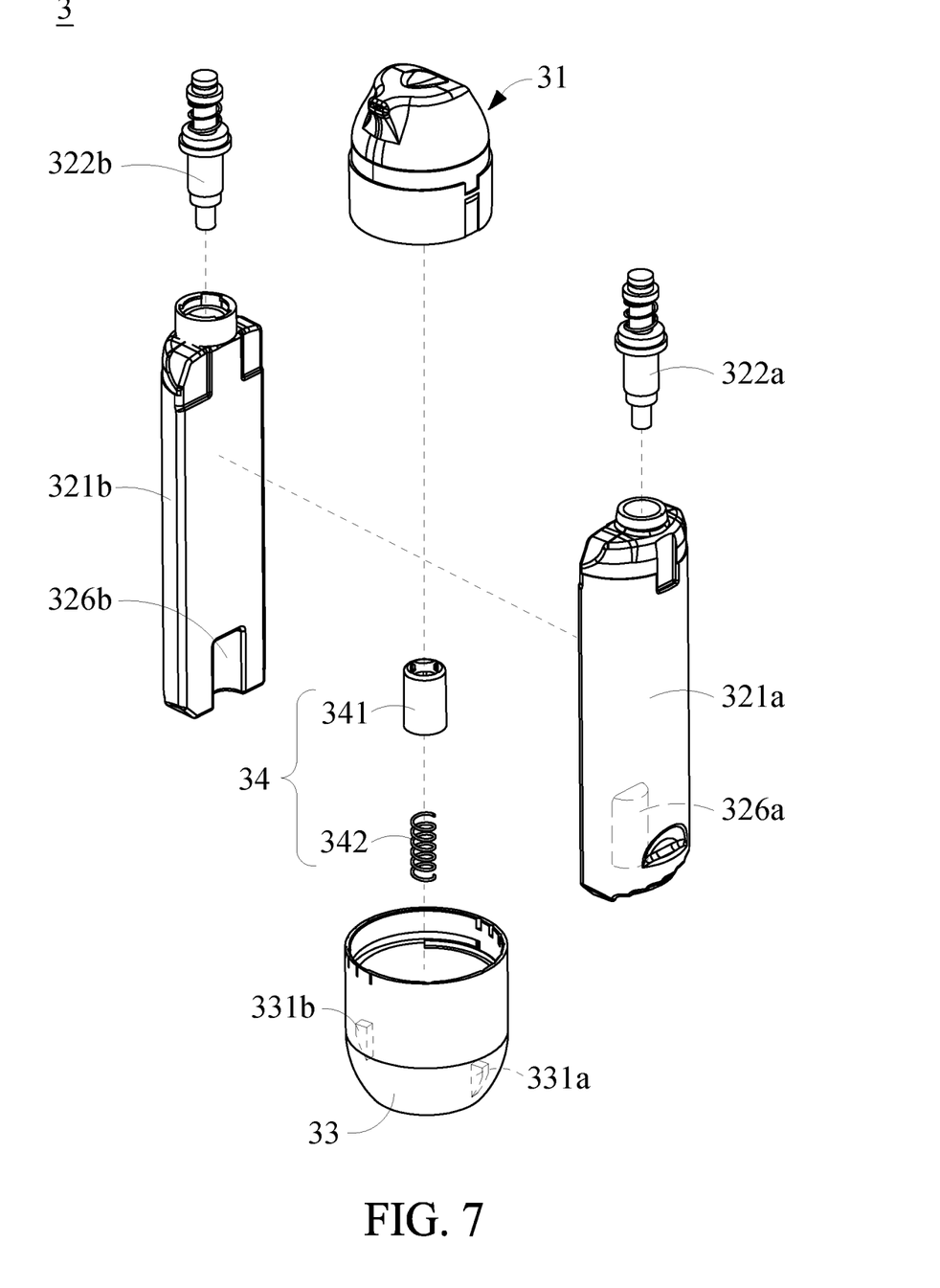
FIG. 7 is an exploded view of the dispensing device according to embodiment 3 of the present disclosure.

Embodiment 3 of the present disclosure provides a dispensing device 3. Referring to FIG. 7, the dispensing device 3 in embodiment 3 is substantially identical to the dispensing device 1 in embodiment 1 structurally and functionally except for the technical features described below. The dispensing device 3 further comprises a reset device 34. The reset device 34 is disposed at two bottles 321a, 321b. The reset device 34 provides a thrust for pushing the two bottles 321a, 321b. One end of the reset device 34 connects to the regulation device 33, whereas the other end of the reset device 34 connects to the two bottles 321a, 321b, such that the two bottles 321a, 321b are separated from the regulation device 33 by a short distance. Given the reset device 34, it is only when the user presses the nozzle 31 that the two abutting portions 331a, 331b of the regulation device 33 abut against the two bottles 321a, 321b, and the two pump units 322a, 322b each move a predetermined distance. Since the reset device 34 provides a thrust for pushing the two bottles 321a, 321b, the two bottles 321a, 321b return to their initial positions under the thrust provided by the reset device 34 as soon as the user stops pressing the nozzle 31; hence, the two pump units 322a, 322b each move a fixed distance whenever the user presses the nozzle 31. Therefore, the substances provided by the dispensing device 3 are of a specific proportion whenever the user presses the nozzle 31.

Concave portions 326a, 326b are disposed at bottom edges of two facing sides of the two bottles 321a, 321b, respectively. The two concave portions 326a, 326b jointly define a receiving space. The reset device 34 comprises a pushing element 341 and a resilient component 342. The pushing element 341 is partially disposed in the receiving space and abuts against the two concave portions 326a, 326b. The resilient component 342 is a compression spring. One end of the resilient component 342 abuts against the pushing element 341. The other end of the resilient component 342 connects to the regulation device 33. Therefore, not only are the two bottles 321a, 321b separated from the regulation device 33 by a short distance because of the reset device 34, but the resilient component 342 also exerts a thrust.

In this embodiment, the reset device 34 is disposed between the regulation device 33 and the two bottles 321a, 321b and exerts a thrust under which the two bottles 321a, 321b return to their initial positions. In a variant embodiment, the reset device 34 is disposed at any other points of the two bottles 321a, 321b or positioned proximate to the bottoms of the two bottles 321a, 321b without directly abutting against the two bottles 321a, 321b, and exerts a thrust under which the two bottles 321a, 321b return to their initial positions, but the present disclosure is not limited to embodiment 3.

In a variant embodiment, the resilient component 342 is a conventional resilient component, such as a leaf spring or rubber, but the resilient component 342 is not limited to embodiment 3.

Figure 8:
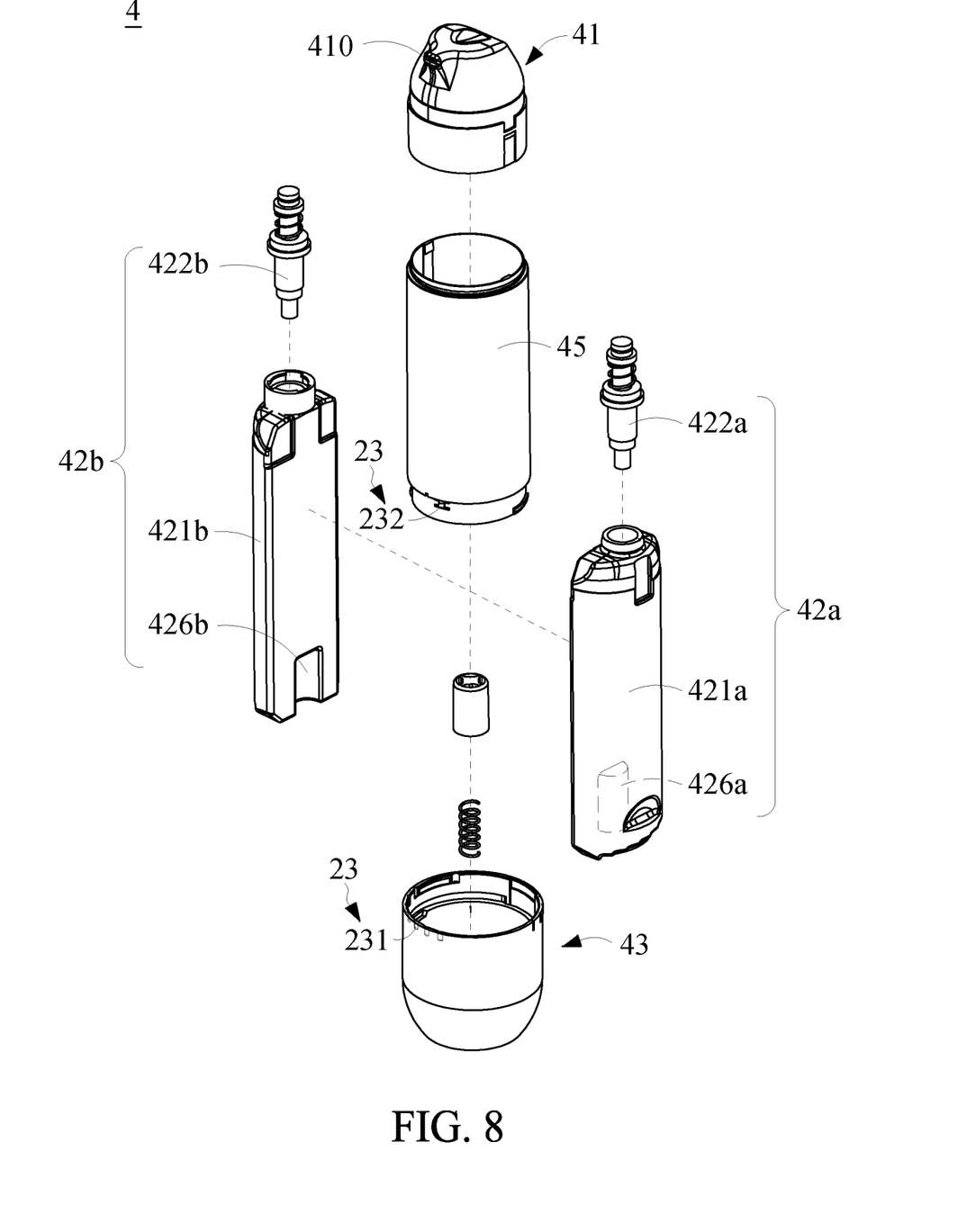
FIG. 8 is an exploded view of the dispensing device according to embodiment 4 of the present disclosure.

Embodiment 4 of the present disclosure provides a dispensing device 4. Referring to FIG. 8, the dispensing device 4 in embodiment 4 is substantially identical to the dispensing device 3 in embodiment 3 structurally and functionally except for technical features described below. The dispensing device 4 comprises a positioning device 45. The positioning device 45 is disposed in the vicinity of the two bottles 421a, 421b. Owing to the positioning device 45, the two bottles 421a, 421b can only face in a specific direction while connecting to the nozzle 41. Therefore, the positioning device 45 is a foolproof device adapted to prevent the two bottles 421a, 421b from fitting to the nozzle 41 and the regulation device 43 wrongly.

Figure 9:
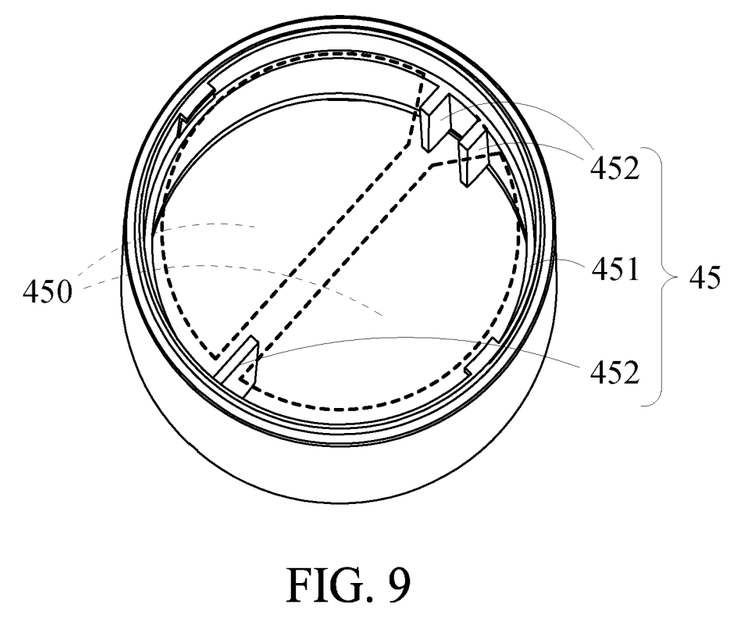
FIG. 9 is a partial schematic view of the dispensing device according to embodiment 4 of the present disclosure.
Figure 10:
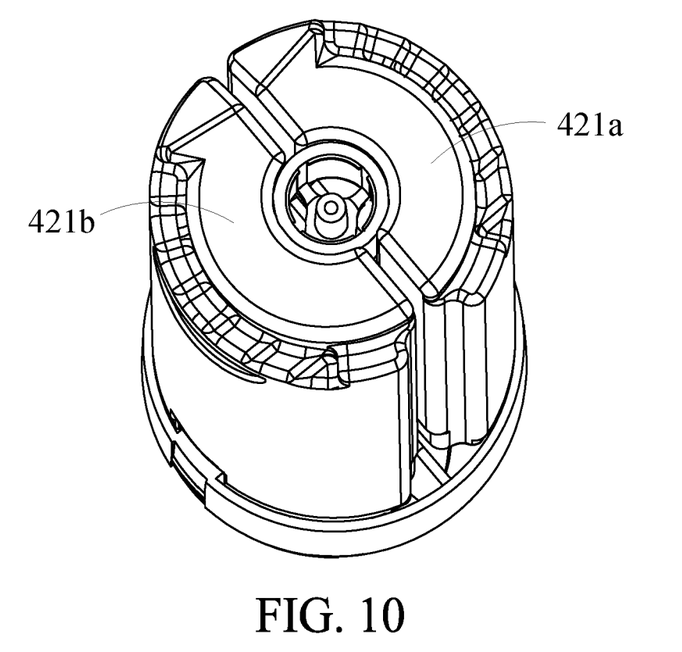
FIG. 10 is a partial schematic view of the dispensing device assembled according to embodiment 4 of the present disclosure.

Referring to FIGS. 8 and 9, the positioning device 45 comprises a casing 451 and a plurality of restrictive elements 452. The restrictive elements 452 are disposed on the inner wall of the casing 451. The restrictive elements 452 and the inner wall of the casing 451 jointly define two receiving spaces 450. The two receiving spaces 450 are each of asymmetric shape, whereas the two bottles 421a, 421b are each of asymmetric cylindrical shape, thereby ensuring that the two bottles 421a, 421b must face in a specific direction while being inserted into the casing 451 and being connected to the nozzle 41 (see FIG. 10).

In embodiment 4, the restrictive elements 452 of the positioning device 45 are plate-shaped and disposed between the two bottles 421a, 421b. Therefore, not only can the restrictive elements 452 function as the bottle limiting device 45, but the restrictive elements 452 also prevent the two bottles 421a, 421b from moving laterally or rotating, thereby ensuring that the amounts of substances provided by the two bottles 421a, 421b will not vary because the two bottles 421a, 421b inadvertently rotate or move relative to the regulation device 43. In a variant embodiment, at least a plate or at least a block is disposed between the two bottles 421a, 421b to function as the bottle limiting device, and thus the present disclosure is not limited to embodiment 4.

In embodiment 4, the positioning device 45 is disposed in the vicinity of the two bottles 421a, 421b. In a variant embodiment, the positioning device 45 is directly coupled to the outer peripheral surfaces of the two bottles 421a, 421b, and thus the present disclosure is not limited to embodiment 4.

In embodiment 4, a regulation limiting unit 23 is disposed between the positioning device 45 and the regulation device 43. Referring to FIG. 8, the regulation limiting unit 23 comprises a plurality of regulation limiting concave portions 231 disposed at the end of the inner peripheral surface of the regulation device 43 and a regulation limiting convex portion 232 disposed at the end of the peripheral surface of the positioning device 45 and corresponding in position to one of the regulation limiting concave portions 231. The regulation device 43 uses the regulation limiting unit 23 to control the angle by which the regulation device 43 rotates each time and thereby attain a specific proportion. For example, given an initial proportion of 20/80, a single instance of rotation brings about a resultant proportion of 10/90. In the absence of the regulation limiting unit 23, the rotation can be overdone, and in consequence the initial proportion of 20/80 is instantaneously reversed to become a proportion of 80/20 to the user's disappointment. Typical users rotating the regulation device 43 seldom see and look at graduations on the regulation device 43. The presence of the regulation limiting unit 23 enhances ease of use and ensures restrictive regulation attained by the rotation of the regulation device 43. Furthermore, the regulation limiting unit 23 prevents the regulation device from rotating by an angle greater than 180 degrees which will otherwise cause the two bottles (which the two abutting portions of the regulation device abut against) to swap their positions; if the aforesaid undesirable situation occurs, the two abutting portions no longer abut against their previous bottle partners, and in consequence the proportion of the substances provided by the two bottles as a function of the angle of rotation of the regulation device dose not correspond to the original preset value.

Figure 11:
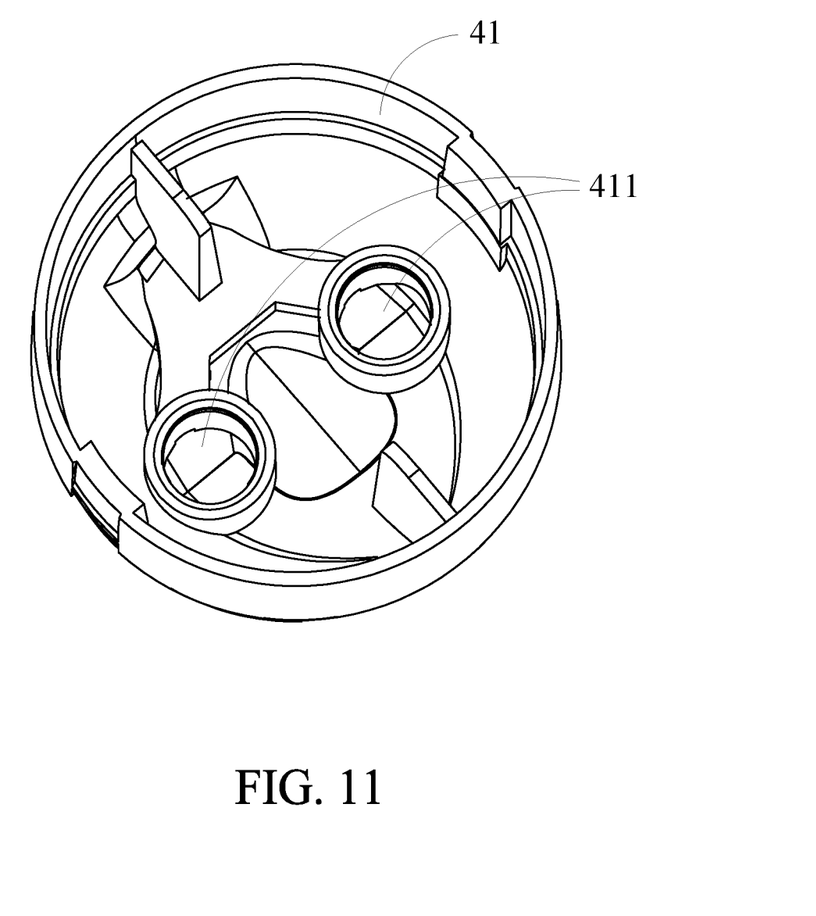
FIG. 11 is a partial schematic view of the dispensing device according to embodiment 4 of the present disclosure.

Referring to FIGS. 8 and 11, the nozzle 41 has two guide chambers 411. The two guide chambers 411 are in communication with an ejection hole 410 of the nozzle 41. Two pump units 422a, 422b fit inside two guide chambers 411 of the nozzle 41, respectively. Since the two pump units 422a, 422b fit inside two guide chambers 411 of the nozzle 41, respectively, it is feasible for the two containers 42a, 42b to be removably coupled to the nozzle 41. Therefore, after the dispensing device 4 has run out of the substances, the user changes the containers 42a, 42b in order to regain the substances rather than purchases the dispensing device 4 anew, thereby cutting operation costs.

Therefore, given the regulation device, the dispensing device overcomes a drawback of the prior art: although a conventional dispenser can provide two types of substances simultaneously, it fails to regulate the amounts of the provided substances according to a specific proportion. The regulation limiting unit places a limitation on the angle of rotation of the regulation device such that the proportion of the substances provided by the two bottles as a function of the angle of rotation of the regulation device dose not correspond to the original preset value. The reset device ensures that the dispensing device provides the substances in a specific proportion whenever the user presses the nozzle. The positioning device is a foolproof device adapted to prevent the two bottles from fitting to the nozzle and the regulation device wrongly. Last but not least, owing to the two guide chambers of the nozzle, the two containers of the dispensing device are removably coupled to the nozzle.

While the present disclosure has been described by means of specific embodiments, numerous modifications and variations could be made thereto by those skilled in the art without departing from the scope and spirit of the present disclosure set forth in the claims.

The claims are as follows:

1. A dispensing device, comprising:
a nozzle having an ejection hole;
two containers each comprising:
a bottle adapted to provide a substance and having a regulated unit disposed at a bottom of the bottle; and
a pump unit linearly, movably connecting to the bottle, being in communication with the nozzle, and being adapted to provide the substance in the bottle to the nozzle; and
a regulation device rotatably connecting to the regulated units of the two bottles or positioned proximate to the regulated units of the two bottles, wherein, when the regulation device is rotated, the two bottles vary in height relative to the regulation devices, thereby providing the substance according to a specific proportion;
wherein the regulated unit of each said bottle is a step surface or an oblique surface, and the regulation device comprises two abutting portions abutting against the regulated units of the two bottles respectively or positioned proximate to the regulated units of the two bottles respectively, such that the two abutting portions move along the regulated units of the two bottles when the two abutting portions rotate together with the regulation device;
wherein each said regulated unit has a stop element disposed at a highest point or a lowest point of a step surface or an oblique surface of a corresponding one of the bottles.

2. The dispensing device of claim 1, further comprising a reset device positioned proximate to the two bottles or disposed at the two bottles and adapted to provide a thrust for pushing the two bottles.

3. The dispensing device of claim 2, wherein the reset device comprises a resilient component and a pushing element positioned proximate to or disposed at bottoms of the two bottles, and the resilient component abuts against the pushing element.

4. The dispensing device of claim 1, further comprising a bottle limiting device disposed between the two bottles and adapted to prevent the two bottles from moving laterally or rotating.

5. The dispensing device of claim 4, wherein the bottle limiting device comprises at least a plate or at least a block.

6. The dispensing device of claim 1, wherein a positioning device is disposed between the nozzle and the regulation device and disposed in the vicinity of the two bottles or on outer peripheral surfaces of the two bottles, whereas a regulation limiting unit is disposed between the positioning device and the regulation device and comprises a plurality of regulation limiting concave portions on an inner peripheral surface of the regulation device and a regulation limiting convex portion disposed on an outer peripheral surface of the positioning device and corresponding in position to one of the regulation limiting concave portions.

7. The dispensing device of claim 1, further comprising a positioning device disposed in vicinity of the two bottles or on outer peripheral surfaces of the two bottles to ensure that the two bottles face in a specific direction while connecting to the nozzle.

8. The dispensing device of claim 1, further comprising a positioning device comprising a casing and a plurality of restrictive elements, with the restrictive elements disposed on an inner wall of the casing, wherein the restrictive elements and the inner wall of the casing jointly define two receiving spaces which have asymmetric shape and receive the two bottles respectively.

9. The dispensing device of claim 1, wherein the nozzle has two guide chambers in communication with an ejection hole of the nozzle, and the two pump units fit inside the two guide chambers of the nozzle, respectively.

* * * * *